United States Patent [19]

Odawara et al.

[11] Patent Number: 4,827,470
[45] Date of Patent: May 2, 1989

[54] INFORMATION MEMORY MEDIUM

[75] Inventors: Kazuharu Odawara, Yokohama; Nobuo Inage, Tokyo, both of Japan

[73] Assignee: Kabushiki Kaisha Toshiba, Kawasaki, Japan

[21] Appl. No.: 116,661

[22] Filed: Nov. 4, 1987

[30] Foreign Application Priority Data

Nov. 5, 1986 [JP] Japan ................ 61-263352

[51] Int. Cl.$^4$ .............................. G11B 7/24
[52] U.S. Cl. .................... 369/282; 360/133; 360/135; 369/271; 369/290
[58] Field of Search ............... 369/270, 271, 282, 273, 369/284, 289, 290; 360/97, 133, 135

[56] References Cited

U.S. PATENT DOCUMENTS

| 4,097 | 1/1887 | Odawara . | |
|---|---|---|---|
| 2,806,704 | 9/1957 | Burdett | 369/270 |
| 3,706,085 | 12/1972 | Mowrey et al. | 369/270 |
| 4,587,647 | 5/1986 | Mak et al. | 369/270 |
| 4,658,311 | 4/1987 | Sakaguchi | 369/270 |

FOREIGN PATENT DOCUMENTS 192244 8/1986 European Pat. Off. ........... 361/282

Primary Examiner—Steven L. Stephan
Attorney, Agent, or Firm—Cushman, Darby & Cushman

[57] ABSTRACT

An optical disk comprising a disk-like body having two base plates made of synthetic resin and two recording layers formed on the base plates, respectively. The body is formed by bonding the base plates, with a spacer interposed therebetween, such that the recording layers face each other. The disk further comprises two centering members, each projecting from the surface of the center portion of each base plate. Each centering member is made of synthetic resin, and one magnetic member is mounted on the centering member. The centering member is inserted in a hole formed in the center portion of the body. The centering member has a center hole defining the center of rotation of the body, and also a recess for holding the magnetic member. Four through-holes are formed in the bottom of the recess. The magnetic member has four projections and is held in the recess, with the projections inserted into the through-holes of the bottom of the recess. Since the optical disk has magnetic members, one on each surface, it can be attracted to the turntable of a drive mechanism by means of the magnetic force exerted by the magnet fitted in the recess formed in the surface of the turntable.

7 Claims, 4 Drawing Sheets

INFORMATION MEMORY MEDIUM

BACKGROUND OF THE INVENTION

The present invention relates to an information memory medium, such as an optical disk, for use in an information processing apparatus, on which information can be recorded and from which it can be reproduced or erased when irradiated by an optical beam, such as a laser beam.

Nowadays, information processing apparatuses which employ an optical disk as a memory medium are in widespread use. During the use of the information processing apparatuses, the information memory medium is held on a turntable. A conventional magnetic memory medium is held on the turntable by a magnet clamper. The clamper has a magnet, and the turntable is formed of magnetic material. Thus, conventional magnetic memory medium is held on the turntable by the magnetic attraction produced by the clamper. The same type of a magnet clamper is used to hold an optical disk on the turntable of the information processing apparatus.

The inventors hereof have filed U.S. patent application Ser. No. 004,097, which discloses a small-height, lightweight, and low-cost information-processing apparatus having a turntable with a magnet embedded therein, and using an information memory medium (i.e., an optical disk) with a metal plate attached thereto.

This copending application also discloses two types of optical disk. In the first type, the metal plate is directly attached to the main body of the disk. In the second type, the metal plate is connected to a centering member which in turn is attached to the main body of the disk. The information memory medium according to the present invention is of the second type, but is different as regards the means for attaching a metal plate to the centering member of the disk. Moreover, the medium of this invention requires a mechanism which is less complex than the one used in the medium disclosed in U.S. patent application Ser. No. 004,097, for attaching the magnet member to the centering member.

SUMMARY OF THE INVENTION

Accordingly, the object of the present invention is to provide an information memory medium which can be securely mounted on or attached to the turntable of an information processing apparatus.

According to the present invention, an information memory medium is provided which is adapted to be driven by a drive mechanism having a turntable for rotating the medium and a magnetic attraction member for magnetically attracting the medium to the turntable. The information memory medium comprises a body having a disk-like base plate and a recording portion for recording information; a centering member, provided on the center portion of the body, for centering the body on the turntable; and a magnetic member held in the centering member and adapted to be attracted to the magnetic attraction member. A recess is formed in the center portion of the centering member and opens to the base plate. A through-hole is formed in the bottom of this recess. The magnetic member has at least one projection fitted into the through-hole, whereby the magnetic member is held in the recess of the centering member.

BRIEF DESCRIPTION OF THE DRAWINGS

A more complete appreciation of the invention and many of the attendant advantages thereof will be readily obtained, as the same become better understood by reference to the following detailed description, when considered in connection with the accompanying drawings, in which.

DETAILED DESCRIPTION OF THE PREFERRED EMBODIMENTS

Preferred embodiments of the present invention will now be described in detail with reference to the accompanying drawings.

Figure 1:
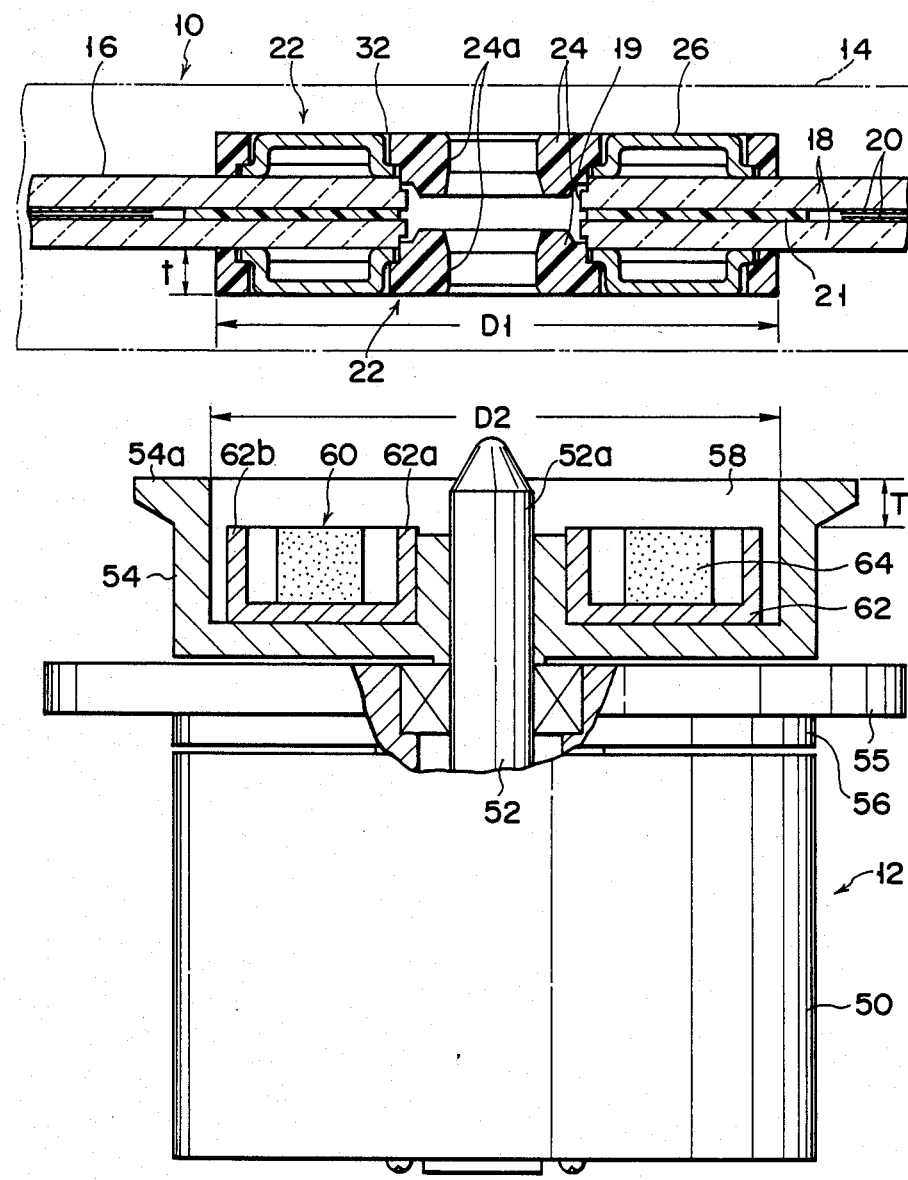
FIG. 1 is a partially cross-sectional side view of an information processing apparatus in which an information memory medium of this invention can be used.

As shown in FIG. 1, an information processing apparatus comprises optical disk 10 used as an information memory medium, and drive mechanism 12 for rotating optical disk 10. Disk 10 contained in cartridge 14 (indicated by two-dot and dash line), is inserted into the apparatus through a medium slot cut in a housing of the apparatus. Thereupon, disk 10 is automatically introduced horizontally into a predetermined position by a medium guiding/loading mechanism. During this process, part of cartridge 14 is open so that the center portion of disk 10 is exposed. Thereafter, cartridge 14 is moved along the plane of disk 10, so that the disk is mounted automatically on drive mechanism 12.

Optical disk 10 comprises body 16 and a pair of attractable members 22. Body 16 comprises two disk-shaped base plates 18, two information recording layers 20, inside spacer 21, an outside spacer (not shown). Either base plate 18 has bore 19 and is made of transparent synthetic resin, such as acrylic resin or polycarbonate, by means of injection molding. Information recording layers 20 are formed on base plates 18, respectively. The spacers, both shaped like a ring, are interposed between those surfaces of base plates 18 which face away from layers 20. The spacers are bonded to each other and also to plates 18 by means of ultrasonic curing, whereby base plates 18 are coupled con- centrically.

Figure 2:
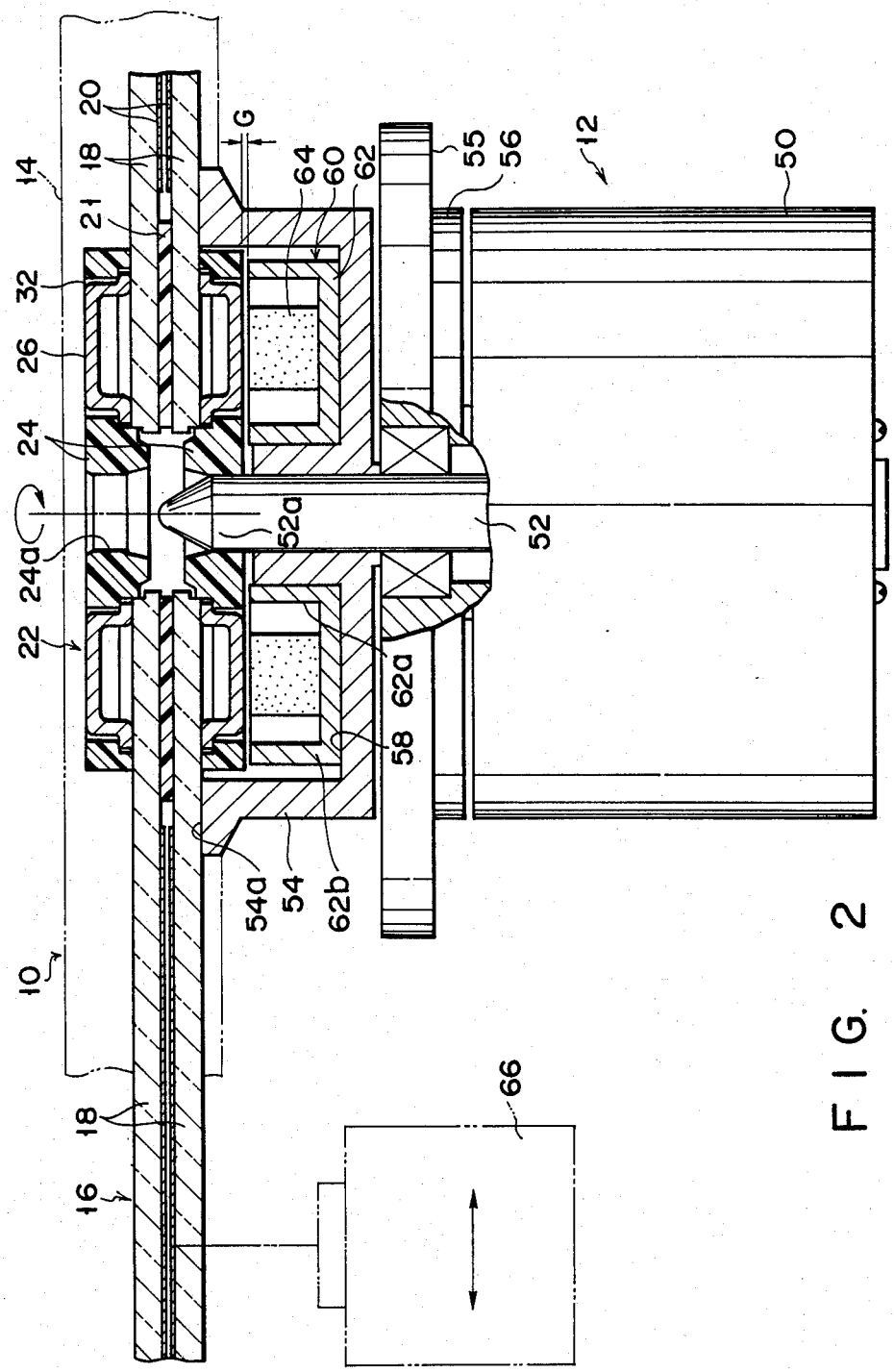
FIG. 2 is a partially cross-sectional side view of the same information processing apparatus, in which the information memory medium of the invention is attached to a drive mechanism.
Figure 3:
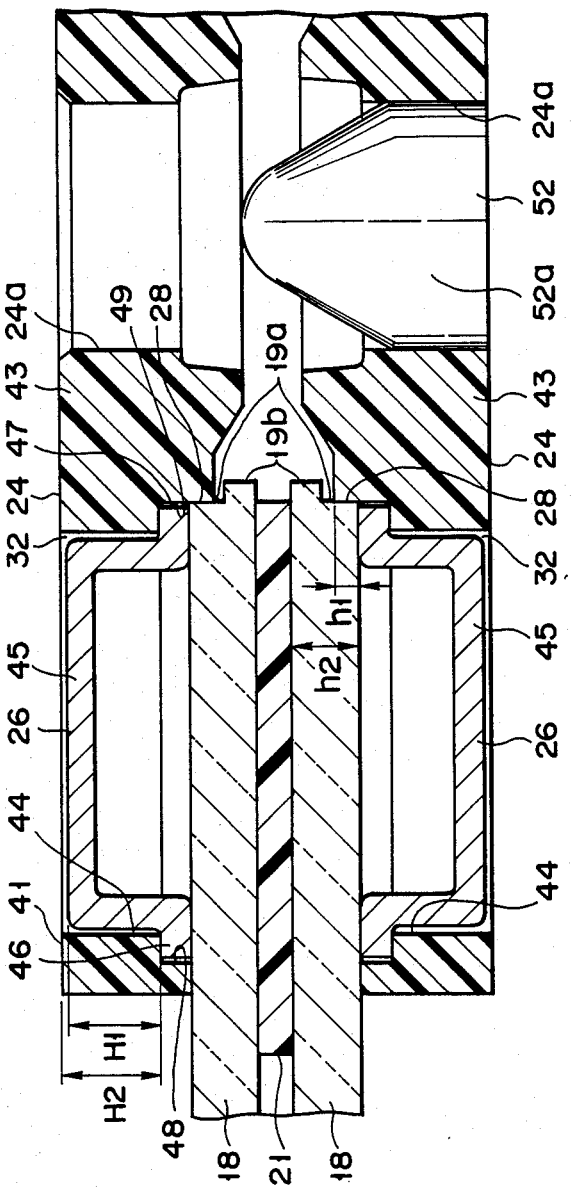
FIG. 3 is a sectional view of an essential portion of the information memory medium according to an embodiment of the present invention.
Figure 4:
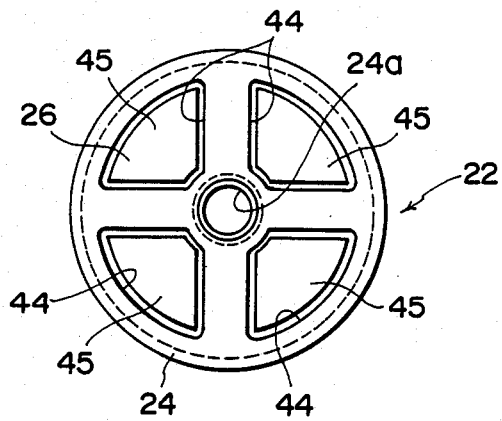
FIG. 4 is a plan view of an attractable member used in the information memory medium.
Figure 5:
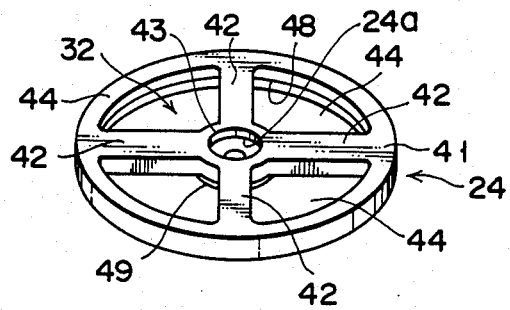
FIG. 5 is a perspective view of a centering member.
Figure 6:
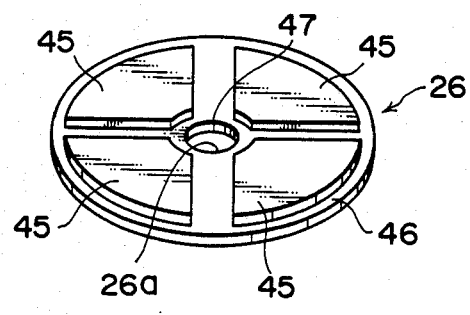
FIG. 6 is a perspective view of a magnetic member.

As is shown in FIGS. 1 to 3, either attractable member 22 is fixed to the center portion of the associated base plate 18. Attractable member 22 has centering member 24 and magnetic member 26 contained in centering member 24.

As is shown in FIGS. 1 to 5, centering member 24 consists of annular frame 41 and four spokes 42, and has thickness t. Spokes 42 are connected together at the center of frame 41, thereby forming a center portion 43 of centering member 24. The center portion 43 has center hole 24a.

Further, either centering member 24 has ring-shaped projection 28 coaxial with hole 24a. While projection 28 is fitted in bore 19 of its corresponding base plate 18, it is fixedly bonded to the outer surface of the base plate, or the opposite surface thereof to that surface on which information record layer 20 is formed. Thus, centering member 24 is coaxially positioned relatively to base plate 18.

As is shown in FIG. 1, either centering member 24 has been made by cutting recess 32 in a disk, and then by cutting four through holes 44 in the bottom of recess 32. Centering member 24 is bonded to the corresponding base plate 18 by bonding agent, such as epoxy resin, which has no adverse influence on base plate 18.

In order to shorten the working time for base plates 18, bore 19 of each plate 18 is formed during the process of injection molding. Base 19 formed in this manner is formed, as shown in FIG. 3, in a stepwise shape having a large-diameter portion 19a and a small-diameter portion 19b formed by exfoliating by a punch in case of cutting by the punch of an injection molding machine.

Large-diameter portion 19a of bore 19 is formed with higher dimensional accuracy than small-diameter portion 19b. Therefore, height h1 of projection 28 of each centering member 24 is shorter than axial length h2 of portion 19a so that projection 28 can engage only portion 19a of higher accuracy. Thus, members 24 are fixed with high positional accuracy, without being substantially eccentric to base plates 18.

Bore 19 of each base plate 18 is worked with high accuracy, so as to be coaxial with a spiral pre-groove (not shown) for recording and reproduction, formed on the base plate. Likewise, the outer peripheral surface of projection 30 and center hole 26a of each centering member 26 are worked with high accuracy, so as to be coaxial with each other. Thus, when member 24 is fixed to base plate 18, the center of the pre-groove is accurately in alignment with that of hole 24a or the center of rotation of base plate 18. It is therefore possible to prevent lowering of recording/reproducing accuracy or increase of access time, which will result if the pre-groove is eccentric to the rotational center of base plate 18.

Both centering members 24 are made of the same synthetic resin as base plates 18, and have substantially the same thermal expansion coefficient as base plates 18. Therefore, either base plate 18 and centering member 24 bonded to plate 18 do not distort each other even when the ambient temperature changes greatly.

Each magnetic member 26 is made of metal. As is shown in FIGS. 1 to 4 and FIG. 6, magnetic member 26 is shaped like a disk, and has through hole 26a at the center. Four projections 45 are formed on either magnetic member 26, and fitted in four through holes 44 of centering member 24. Magnetic member 26 has outer flange 46 and inner flange 47. Step portions 48, 49 are formed at the inner periphery of outer frame 41 and outer periphery of center portion 43, respectively, and are formed at the interface of base plate 18.

Magnetic member 26 is held in recess 32 of centering member 24 in the state that projection 45, outer flange 46 and inner flange 47 are respectively engaged with through hole 55, step portions 48 and 49. In this case, height $H_1$ of projection 45 is substantially equal to or slightly less than thickness $H_2$ of centering member 24. A narrow gap is formed between projection 45 and through hole 44, and flange 46 and flange 47 have a slightly smaller width than step portions 48 and 49 or substantially the same thickness as step portions 48, 49. Accordingly, magnetic member 26 cannot move in a direction perpendicular to the surface of base plate 18, but can move slightly in a direction parallel to the surface of base plate 18.

In this way, magnetic member 26 can easily be attached to centering member 24 since the mechanism required is simple.

As shown in FIGS. 1 and 2, drive mechanism 12 for driving optical disk 10 includes brushless DC motor 50 of an outer-rotor type, for use as a drive source, and turntable 54 mounted on rotating shaft 52 of motor 50 and adapted to be rotated by motor 50. Tip end portion 52a of shaft 52 is inserted into center hole 26a of disk 10, as will be mentioned later, thus constituting a positioning portion for positioning the disk relatively to turntable 54. Motor 50 is supported by frame 55, which is fitted to control board 56 for controlling the operation of the motor Turntable 54, which is formed of nonmagnetic metal, has support surface 54a extending perpendicular to shaft 52 of motor 50. Also, turntable 54 is formed with circular depression 58, which is coaxial with shaft 52, and opens to surface 54a. Diameter D3 of depression 58 is greater than diameter D1 of centering member 24 of optical disk 10. Depression 58 contains magnetic attraction member 60 which magnetically attracts one of attractable members 22 of disk 10. Attraction member 60 includes ring-shaped yoke 62 and magnet 64, which are arranged coaxially with shaft 52. Yoke 62 has inner and outer peripheral walls 62a and 62b, coaxial with each other, and magnet 64 is located between the peripheral walls. The top faces of yoke 62 and magnet 64 are located at distance T from support surface 54a of turntable 54. Distance T is greater than height t of projection of centering members 24 of optical disk 10. Thus, housed in depression 58, magnetic attraction means 60 can fully exhibit its force of attraction for mounting disk 10 on turntable 54, and prevent magnetic leakage to the outside.

As described above, diameter D1 and height t of centering member 24 are smaller than diameter D2 of depression 58 and distance T, respectively. Therefore, if optical disk 10 is set on turntable 54 so that positioning portion 52a of shaft 52 is inserted in one of center holes 24a of attractable members 22, as shown in FIG. 2, one of attractable members 22 is housed fully in depression 58. As a result, magnetic member 26 of attractable member 22 is attracted to magnet 64, so that disk 10 is mounted in direct contact with support surface 54a of turntable 54.

Thus, base plate 18 having information record layer 20 thereon is held securely to turntable 54, so that vibration of base plate 18 perpendicular to its surface can be minimized. Accordingly, information can be recorded and reproduced correctly. If attractable member 22, not base plate 18, contacted support surface 54a of turntable 54, optical disk 10 would vibrate greatly, unless the surface of member 24 and base plate 18 are very accurately parallel to each other. Therefore, member 24 and the layer of adhesive must have a uniform thickness. It is very difficult, however, to form member 24 and the adhesive layer which have uniform thicknesses.

The length of positioning portion 52a of shaft 52 is such that portion 52a can be fitted in only center hole 24a of the turntable-side attractable member when optical disk 10 is mounted on turntable 54. There will be no substantial projection even if center holes 24a of centering members 24 are not aligned with high accuracy.

To fit positioning portion 52a in center holes 24a of both centering member 24, these holes 24a must be coaxial with each other. However, it is very difficult to align bores 19 of base plates 18 or center holes 24 of members 24. If positioning portion 52a is too long, it takes a long time to set optical disk 10 on turntable 54. This helps wear the disk.

Magnetic attraction means 60 is housed in depression 58 formed in turntable 54, so that magnetic leakage is reduced to a low level. Accordingly, iron filings or powder of other magnetic material does not hinder the engagement of shaft 52 and center hole 24a by sticking to shaft 52.

As mentioned above, height t of projection of either centering member 24 is less than distance T between the top faces of yoke 62 and magnet 64 and support surface 54a of turntable 54. When optical disk 10 is mounted on table 54, therefore, gap G is defined between attractable member 22 and magnetic attraction means 60. Gap G has is so broad that the disk is magnetically attracted to turntable 54. Therefore, as turntable 54 rotates, disk 10 is reliably rotated, and disk 10 can be removed easily from turntable 54 by only lifting cartridge 14. In this embodiment, gap G has such a size that force of attraction of about 700 g acts on attractable member 24.

In FIG. 2, numeral 66 designates a head, which is moved in the radial direction of optical disk 10 by head moving means, such as a linear motor. Head 66 can record information on, and reproduce information from, on information record layer 20 formed on lower-side base plate 18.

Since base plate 18 and centering member 24 are formed of synthetic resins having substantially the same thermal expansion coefficient, and magnetic member 26 is further mounted on centering member 24, the base plate and the centering member do not distort each other even if the ambient temperature changes greatly. Therefore, information can be correctly recorded on, or reproduced from, the disk.

Further, since magnetic member 26 can slightly move in parallel with the surface of base plate 18 with respect to centering member 24, the difference of thermal expansion coefficients between centering member 24 and magnetic member 26 can be compensated for, and the distortion of the base plate can be further reduced.

The present invention is not limited to the embodiments described above. Various other changes and modifications may be made within the spirit and scope of the present invention.

However, the base plate may be made of materials other than resins, such as glass, or ceramics. Further, the centering member can be made of any material other than synthetic resin. The centering members can be made of any material having substantially the same thermal expansion coefficient as the material of the base plate. If the base plates are made of glass, the centering members may be formed of glass or ceramic material.

The embodiments described above are optical disks having two disk base plates. Alternatively, the disk may have only one plate. Further, magnetic attraction means 60 may be formed only of a magnet. Depression 58 in turntable 54 can be hexagonal or rectangular, not circular. Each attractable member 22 must only have shape and size so that it can be housed in the depression.

In the aforementioned embodiments, moreover, the yoke of the magnetic attraction means has inner and outer peripheral walls. Alternatively, it may be provided with only an inner peripheral wall, or only an outer peripheral wall.

Centering member 24 and magnetic member 26 are not necessarily limited to the above-mentioned shape, but magnetic member 26 may, in summary, be contained in centering member so as to be slightly movable in a direction parallel to the surface of base plate 18.

What is claimed is:

1. An information memory medium adapted to be driven by a drive mechanism having a turntable for rotating said medium and a magnetic attraction member for magnetically attracting said medium to said turntable, said information memory medium comprising:
    a plane body having a base plate and a recording portion supported by said base plate for recording information; and
    an attractable member, provided on the center portion of said body, for holding said medium to said turntable and centering said body on said turntable;
    wherein said attractable member includes a first member having an accommodating portion and supported by said body, and a second member adapted to be magnetically attracted to said magnet attraction member, and having a base portion and a projection projecting from said base portion, said accommodating portion has a recess opening to said base plate and a through-hole formed in the bottom of said recess, said base portion is accommodated in said recess, and said projection is inserted in said through-hole.

2. An information memory medium according to claim 1, wherein
    said first member has a step portion, and said second member has an engaging portion fitted in said step portion for preventing said second member from moving in a direction perpendicular to said base plate; and
    said projection and said engaging portion are shorter than said through-hole and said step portion, respectively, measured in a direction parallel to the base plate.

3. An information memory medium according to claim 2, wherein said second member is mounted on said first member such that said second member is unable to move in a direction perpendicular to the surface of said base plate and free to move in a direction parallel to the surface thereof.

4. An information memory medium according to claim 2, wherein said projection has a height less than the thickness of said first member.

5. An information memory medium adapted to be driven by a drive mechanism having a turntable for rotating said medium and a magnetic attraction member for magnetically attracting said medium to aid turntable, said information memory medium comprising:
    a plane body having a base plate and a recording portion supported by said base plate for recording information;
    an attractable member, provided on the center portion of said body, for holding said medium to said turntable and centering said body on said turntable;
    said attractable member including a first member having a recess opening to said base plate, said recess having a through-hole formed in the bottom portion thereof and being supported by said body, and a second member adapted to be magnetically attracted to said magnetic attraction member, said second member accommodated in said recess and having a projection inserted in said through-hole; and said first member including:
 a ring-shaped frame;
 a center portion having a center hole, defining the center of said body;
 a plurality of spokes connecting the center portion to the ring-shaped frame; and
 said spokes defining the bottom of said recess and said ring-shaped frame, with said center portion and said spokes defining said through-hole.

6. An information memory medium according to claim 5, wherein said centering member has four spokes, and said centering member has four through-holes, and said magnetic member has four projections fitted into the through-holes of said centering member, respectively.

7. An information memory medium adapted to be driven by a drive mechanism having a turntable for rotating said medium and a magnetic attraction member for magnetically attracting said medium to said turntable, said information memory medium comprising:
 a plane body having a base plate and a recording portion supported by said base plate for recording information; and
 an attractable member, provided on the center portion of said body, for holding said medium to said turntable and centering said body on said turntable, said attractable member comprising:
 a first member supported by said body, and having a frame member and a spoke member, said frame member and said spoke member defining an opening and being incorporated as one; and
 a second member of integral construction adapted to be magnetically attracted to said magnetic attraction member, and having a projection inserted in said opening, said projection having a surface exposed away from said first member.

* * * * *